United States Patent
Ellmer

(10) Patent No.: US 11,885,248 B2
(45) Date of Patent: Jan. 30, 2024

(54) METHOD AND DEVICE FOR INSPECTING AND SAFEGUARDING A FUNCTIONALITY OF AN EXHAUST GAS AFTERTREATMENT SYSTEM OF A COMBUSTION ENGINE

(71) Applicant: Vitesco Technologies GmbH, Hannover (DE)

(72) Inventor: Dietmar Ellmer, Regensburg (DE)

(73) Assignee: Vitesco Technologies GmbH, Hannover (DE)

( * ) Notice: Subject to any disclaimer, the term of this patent is extended or adjusted under 35 U.S.C. 154(b) by 139 days.

(21) Appl. No.: 17/496,988

(22) Filed: Oct. 8, 2021

(65) Prior Publication Data
US 2022/0025808 A1    Jan. 27, 2022

Related U.S. Application Data

(63) Continuation of application No. PCT/EP2020/057478, filed on Mar. 18, 2020.

(30) Foreign Application Priority Data

Apr. 8, 2019 (DE) ...................... 10 2019 204 992.3

(51) Int. Cl.
*F01N 11/00* (2006.01)
*F01N 3/20* (2006.01)

(52) U.S. Cl.
CPC ............ *F01N 11/00* (2013.01); *F01N 3/2013* (2013.01); *F01N 2240/16* (2013.01);
(Continued)

(58) Field of Classification Search
CPC .... F01N 11/00; F01N 3/2013; F01N 2240/16; F01N 2550/22; F01N 2900/0412;
(Continued)

(56) References Cited

U.S. PATENT DOCUMENTS

| 5,224,335 A | 7/1993 | Yoshizaki |
| 2008/0197856 A1 | 8/2008 | Schnaibel |

(Continued)

FOREIGN PATENT DOCUMENTS

| DE | 102004031625 A1 | 2/2006 |
| DE | 102007010758 A1 | 9/2008 |
| DE | 102008044271 A1 | 6/2010 |

OTHER PUBLICATIONS

International Search Report and Written Opinion dated May 7, 2020 from corresponding International Patent Application No. PCT/EP2020/057478.

(Continued)

*Primary Examiner* — Brandon D Lee

(57) ABSTRACT

The disclosure relates to a method for checking and ensuring the functionality of an exhaust gas aftertreatment system of an internal combustion engine. The exhaust gas aftertreatment system has a catalytic converter and a voltage source. The catalytic converter has a catalytic converter area and an electrical heating device which is selectively supplied with electrical energy from the voltage source. The method includes determining an actual value which is characteristic of an ohmic resistance of the heating device. The actual value being determined by using an electrical current strength supplied to the heating device and an electrical voltage supplied to the heating device from the voltage source. The method also includes providing a setpoint value which is characteristic of an expected ohmic resistance of the heating device. The setpoint value takes into account a specific heating-up behavior of the heating device and an expected long-term behavior of the catalytic converter.

18 Claims, 1 Drawing Sheet

(52) U.S. Cl.
CPC .. *F01N 2550/22* (2013.01); *F01N 2900/0412* (2013.01); *F01N 2900/0602* (2013.01); *F01N 2900/1631* (2013.01)

(58) Field of Classification Search
CPC ..... F01N 2900/0602; F01N 2900/1631; F01N 13/0097; F01N 3/027; Y02T 10/40
See application file for complete search history.

(56) References Cited

U.S. PATENT DOCUMENTS

| | | |
|---|---|---|
| 2008/0217315 A1 | 9/2008 | Brueck |
| 2010/0134120 A1 | 6/2010 | Barcin |
| 2012/0004801 A1* | 1/2012 | Watanabe ............... F01N 11/00 903/903 |
| 2012/0247090 A1* | 10/2012 | Yoshioka .............. F01N 3/2026 60/286 |
| 2016/0017782 A1* | 1/2016 | Maguin ................. F01N 3/2013 60/274 |
| 2016/0017789 A1* | 1/2016 | Nishi .................... F02D 41/222 123/41.02 |
| 2019/0331015 A1* | 10/2019 | Naumann ............. F01N 3/2026 |
| 2020/0131962 A1* | 4/2020 | Hirooka ................ F01N 3/2026 |

OTHER PUBLICATIONS

German Office Action dated Nov. 5, 2019 for corresponding German Patent Application No. 10 2019 204 992.3.

* cited by examiner

METHOD AND DEVICE FOR INSPECTING AND SAFEGUARDING A FUNCTIONALITY OF AN EXHAUST GAS AFTERTREATMENT SYSTEM OF A COMBUSTION ENGINE

CROSS-REFERENCE TO RELATED APPLICATIONS

This application claims the benefit of PCT Application PCT/EP2020/057478, filed Mar. 18, 2020, which claims priority to German Application 10 2019 204 992.3, filed Apr. 8, 2019. The disclosures of the above applications are incorporated herein by reference.

TECHNICAL FIELD

The disclosure relates to a method and device for checking and ensuring the functionality of an exhaust gas aftertreatment system of an internal combustion engine.

BACKGROUND

Exhaust gas aftertreatment systems are provided, for example, in vehicles with an internal combustion engine, to carry out exhaust gas aftertreatment in order to reduce pollutants from an exhaust gas of the internal combustion engine. In this respect, the exhaust gas aftertreatment system has at least one catalytic converter, which binds the pollutants in the catalytic converter by a chemical conversion through oxidation or reduction. In this respect, the catalytic converter usually has a catalytic converter area in which the chemical conversion—the catalysis—takes place.

The required operating temperature for the catalytic converter area is mostly in a range of ≥200° C., since the exhaust gas catalysis carried out in the catalytic converter area requires a certain minimum temperature for effective exhaust gas aftertreatment. In order to quickly bring the catalytic converter area into the desired temperature range, the catalytic converter may have a heating device which is set up to heat up the catalytic converter area to the desired temperature range when the exhaust gas aftertreatment system is in operation. In some examples, the heating device is conventionally supplied by electrical energy from a voltage source. The heating device is arranged in the exhaust gas aftertreatment system in the immediate vicinity of the catalytic converter area in order that the heat transfer can take place advantageously quickly and with little loss. Therefore, the heating device is arranged in the flow area of the exhaust gas. Over the operating time of the exhaust gas aftertreatment system, malfunctions of the heating device or other components of the exhaust gas aftertreatment system may occur. In particular, the heating device, which is permanently exposed to the exhaust gas over the operating time, may develop malfunctions that impair the functionality of the exhaust gas aftertreatment system.

For example, the internal resistance of the heating device may change over its operating time. Another malfunction, such as damage to the heating device, may cause a short circuit. The malfunctions of the heating device and/or the exhaust gas aftertreatment system may impair its functionality and/or even damage the vehicle.

SUMMARY

The present disclosure relates to a method and a device with which reliable checking and ensuring of the functionality of an exhaust gas aftertreatment system of an internal combustion engine is possible.

One aspect of the disclosure provides a method for checking and ensuring the functionality of an exhaust gas aftertreatment system of an internal combustion engine. The exhaust gas aftertreatment system has a catalytic converter and a voltage source, the catalytic converter has a catalytic converter area and an electrical heating device which is selectively supplied with electrical energy from the voltage source. The method includes determining an actual value which is characteristic of an ohmic resistance of the heating device. The actual value being determined by using an electrical current strength supplied to the heating device and an electrical voltage supplied to the heating device from the voltage source. The method also includes providing a setpoint value which is characteristic of an expected ohmic resistance of the heating device. The setpoint value taking into account a specific heating-up behavior of the heating device and an expected long-term behavior of the catalytic converter. Additionally, the method includes comparing the actual value with the setpoint value in order to check and ensure whether the heating device is functioning in accordance with the specific heating-up behavior and the expected long-term behavior.

Implementations of the disclosure may include one or more of the following optional features. In some implementations, the catalytic converter has the catalytic converter area, in which the catalysis takes place, and the electrical heating device, which is designed to heat up the catalytic converter area. In some examples, the electrical heating device is arranged upstream of the catalytic converter area in the direction of exhaust gas flow, but it is also conceivable that the electrical heating device is arranged downstream of the catalytic converter area in the direction of exhaust gas flow. In some implementations, the catalytic converter includes two electrical heating devices, one of the two being arranged upstream of the catalytic converter area in the direction of exhaust gas flow and the other of the two being arranged downstream of the catalytic converter area in the direction of exhaust gas flow. The electrical heating device is selectively supplied with electrical energy from a voltage source, for example from a rechargeable battery or from a battery. The catalytic converter area only needs to be heated up to a certain temperature by the electrical heating device if the catalytic converter area has a temperature that is below a threshold temperature that is necessary for effective exhaust gas aftertreatment. This is the case, for example, immediately after a cold start of the internal combustion engine. Accordingly, the catalytic converter area does not have to be permanently heated up by the electrical heating device.

In some implementations, the electrical heating device has a honeycomb structure or a matrix structure through which electrical current flows directly from the voltage source, the honeycomb structure or the matrix structure acting as an ohmic resistor. As a result, the honeycomb structure or matrix structure heats up and passes on the heat to the catalytic converter area and/or to the exhaust gas. The temperature of the heating device is thus directly dependent on the electrical energy transmitted from the voltage source.

The ohmic resistance of the heating device may change over the operating time of the heating device, for example due to deposits in the honeycomb structure or in the matrix structure or due to changes in the metallic microstructure. It is also conceivable that the ohmic resistance may change due to damage to the matrix structure and/or the honeycomb structure. Damage to the honeycomb structure and/or the matrix structure of the heating device may lead to a serious change in the ohmic resistance of the heating device and/or even to a short circuit within the heating device. Such damage has an influence on the flow behavior of the electrical energy through the heating device, as a result of which the ohmic resistance of the heating device and thus the heat transfer to the catalytic converter area is changed.

The ohmic resistance can be determined by the electrical current strength and the electrical voltage. Accordingly, the ohmic resistance of the heating device can be determined by the electrical current strength supplied to the heating device and the electrical voltage supplied to the heating device from the voltage source. Damage or a change in the honeycomb structure or in the matrix structure of the heating device can be deduced from the ohmic resistance of the heating device. By determining the ohmic resistance of the heating device, changes or damage to the heating device over the operating time of the heating device can accordingly be detected.

According to the method of the present disclosure, the setpoint value which is characteristic of the expected ohmic resistance of the heating device is provided. The expected ohmic resistance or the corresponding setpoint value takes into account the specific heating-up behavior of the heating device and the expected long-term behavior of the catalytic converter. The specific heating-up behavior of the heating device depends, for example, on the construction of the heating device and on the construction of the honeycomb structure or the matrix structure of the heating device. The specific heating-up behavior of the heating device may, for example, be recorded/measured during the development of the heating device and stored in a memory. This specific heating-up behavior is taken into account when providing the setpoint value.

The expected long-term behavior of the catalytic converter may also be determined during the development and testing of the heating device. The expected long-term behavior maps, for example, a certain service life of the catalytic converter. In some implementations, the service life of the catalytic converter is 5 years or 80,000 vehicle kilometers. In some implementations, the service life of the catalytic converter is 10 years or 160,000 vehicle kilometers. A longer service life is also conceivable. In some examples, the expected long-term behavior of the heating device of the catalytic converter over the entire service life is mapped and stored in the memory.

The setpoint value consequently takes into account the heating-up behavior and the corresponding long-term behavior of the catalytic converter and is provided in accordance with the current operating time of the catalytic converter. The setpoint value changes over the operating time of the catalytic converter. Overall, a setpoint value which is developed in accordance with the current operating time of the catalytic converter and the specific heating-up behavior is thus provided.

In some examples, the actual value is compared with the setpoint value in order to check and ensure whether the heating device is functioning in accordance with the specific heating-up behavior and the expected long-term behavior. The actual value is determined by the electrical current strength supplied to the heating device and the electrical voltage supplied to the heating device. The electrical current strength supplied to the heating device can be determined and the electrical voltage supplied to the heating device can also be determined, so that the actual value determination can be carried out correspondingly easily. Due to changes in the catalytic converter, such as due to changes in the heating device, the actual value may vary over the operating time.

The setpoint value is provided in accordance with the specific heating-up behavior and the expected long-term behavior. Accordingly, the setpoint value also varies over the operating time of the catalytic converter or over the operating time of the heating device. The actual value and the setpoint value may accordingly likewise vary over the operating time of the heating device.

The comparison of the actual value with the setpoint value consequently provides a comparatively good and robust check over the entire operating time of the catalytic converter or over the entire operating time of the heating device of the catalytic converter as to whether the heating device is functioning in accordance with the specific heating-up behavior and the expected long-term behavior and thus ensures that the exhaust gas aftertreatment system is operated in the predetermined operating range. If, for example, the actual value deviates too much from the setpoint value due to damage to the heating device, it can be determined comparatively easily that the heating device is no longer functioning properly. Accordingly, for example, an entry may be made in a fault memory or a message may be output to an operator of the internal combustion engine. Overall, the method may be carried out comparatively easily, but nevertheless provides a reliable value about the functionality of the heating device and thus also about the functionality of the exhaust gas aftertreatment system.

In some implementations, to compare the actual value with the setpoint value, a first difference is formed from the actual value and the setpoint value and the first difference is compared with a first threshold value, it being detected that the heating device is not functioning in accordance with the specific heating-up behavior and the expected long-term behavior if the first difference deviates from the first threshold value by at least a first specific amount. The first difference may be formed, for example, by subtracting the actual value from the setpoint value or by subtracting the setpoint value from the actual value. Parameterization of the actual value or the setpoint value, with the values being represented as a function with one or more variables, is also conceivable before the difference is formed. The first threshold value may, for example, be stored in the memory and continuously compared with the first difference. The first threshold value may, for example, change over the operating time of the catalytic converter. The first specific amount may also be stored in the memory. The first specific amount may also change over the operating time of the catalytic converter. If, for example, it is detected that the first difference deviates positively or negatively from the first threshold value by the first amount, a malfunction of the exhaust gas aftertreatment system can be detected. Such a comparison is easy to carry out and provides a comparatively reliable result over the operating time of the catalytic converter. For example, due to the variability of the first threshold value and the first specific amount, a robust check of the functionality of the exhaust gas aftertreatment system may be implemented over the entire lifetime of the catalytic converter. In some examples, the setpoint value and/or the actual value is/are added up over a specific operating time before the added-up setpoint value is compared with the correspondingly added-up actual value.

In some implementations, the exhaust gas aftertreatment system has a voltage measuring device which is arranged at an end of a transmission cable assigned to the heating device that transmits electrical energy from the voltage source to the heating device during the operation of the heating device, the voltage measuring device being set up to determine a measurement signal which is characteristic of the electrical voltage arriving at the heating device during operation, and the actual value being determined by using the measurement signal of the voltage measuring device. According to this example, the electrical energy is transmitted from the voltage source to the heating device by the transmission cable. One end of the transmission cable is assigned to the heating device, the other end of the transmission cable is assigned to the voltage source. The voltage measuring device is arranged at the end that is assigned to the heating device. The measurement signal accordingly takes into account transmission losses from the voltage source to the heating device. This additionally makes the method more detailed and more reliable.

In some implementations, the voltage measuring device or an additional voltage measuring device is arranged directly on the heating device, which is set up to determine another or an additional measurement signal which is characteristic of the electrical voltage supplied to the honeycomb structure or the matrix structure of the heating device during operation that arrives at the honeycomb structure or the matrix structure. The measurement signal according to this example takes into account additional transmission losses within the heating device. In some examples, an additional voltage measuring device is arranged on a ground line of the electrical heating device, which is set up to determine an additional measurement signal that is characteristic of the electrical voltage in the ground line.

In some implementations, the method also includes comparing the measurement signal of the voltage measuring device with a setpoint voltage value which is characteristic of the expected electrical voltage arriving at the heating device during the operation of the heating device from the voltage source. To compare the measurement signal with the setpoint voltage value, a difference is formed from the measurement signal and the setpoint voltage value and the difference is compared with a second threshold value, it being detected that the transmission cable and/or other components of the exhaust gas aftertreatment system is/are not functioning in accordance with its/their expected functionality if the second difference deviates from the second threshold value by at least a second specific amount.

The measurement signal is characteristic of the voltage supplied to the heating device during operation, consequently the electrical voltage that arrives at the heating device. The setpoint voltage value is characteristic of the expected electrical voltage delivered to the heating device. Accordingly, the setpoint voltage value is characteristic of the voltage transmitted from the transmission cable to the electrical heating device. Accordingly, the setpoint voltage value also takes into account resistance losses of the transmission cable. The setpoint voltage value may, for example, be stored in the memory and may also take into account long-term behavior of the transmission cable that was determined in advance and stored in the memory. The second difference is formed from the measurement signal and the setpoint voltage value. The measurement signal may be subtracted from the setpoint voltage value or the setpoint voltage value may be subtracted from the measurement signal. A parameterization of the measurement signal and/or the setpoint voltage value or other processing of the measurement signal and the setpoint voltage value may also be carried out in order to facilitate the formation of the difference.

The second threshold value may also be stored in the memory and continuously compared with the second difference. The second specific amount may also be stored in the memory. In some examples, the second threshold value and the second amount may change over the operating time of the exhaust gas aftertreatment system. Accordingly, an advantageously robust check of the functionality of the transmission cable or of the other components of the exhaust gas aftertreatment system that transmit electrical energy from the voltage source to the heating device may be implemented over the entire operating time of the exhaust gas aftertreatment system. If, for example, the transmission cable has breaks or other damage and no longer transmits the electrical energy from the voltage source to the heating device as expected, according to this example this can be detected. Overall, in addition to checking the functionality of the exhaust gas aftertreatment system, it is accordingly additionally possible to differentiate between possible sources of error.

According to some implementations, the setpoint value and/or the setpoint voltage value take(s) into account current ambient conditions. Current ambient conditions may be, for example, an ambient temperature. The ambient conditions may influence the heating-up behavior of the heating device and/or the transmission behavior of electrical energy from the voltage source to the heating device. If the ambient conditions are taken into account in the setpoint value and/or the setpoint voltage value, the method can reliably and robustly check the functionality of the exhaust gas aftertreatment system even when the ambient conditions are changing.

In some examples, the setpoint value and/or the setpoint voltage value is/are provided as a characteristics map. The characteristics map may be, for example, a mathematical model that takes various parameters into account and provides the corresponding setpoint value and/or the corresponding setpoint voltage value in accordance with currently prevailing parameters for a reliable comparison of the setpoint value or the setpoint voltage value with the actual value or with the measurement signal. Providing the setpoint value and/or the setpoint voltage value by the characteristics map is a comparatively easy way of taking parameters of the internal combustion engine or the exhaust gas aftertreatment system or ambient conditions into account and thus implementing reliable checking and ensuring of the functionality of the exhaust gas aftertreatment system.

In some implementations, the determination of the actual value and/or the determination of the measurement signal is/are determined by using an electrical test current strength supplied to the heating device and an electrical test voltage supplied to the heating device from the voltage source. The test current intensity and the test voltage may, for example, be supplied to the heating device in a specific test mode. In some examples, the test operation may be carried out before the internal combustion engine is started. The test current strength and the test voltage may accordingly be specifically selected in order to obtain values that are as representative as possible for the actual value or for the measurement signal. It is thus possible to specifically check and ensure the functionality of the exhaust gas aftertreatment system. As a result, the method is additionally reliable and accurate, since uninfluenced results are available. The test current strength and the test voltage may be kept constant over the service life of the exhaust gas aftertreatment system, so that values that can be compared well with one another can be determined over the entire service life of the exhaust gas aftertreatment system.

In some implementations, the electrical test voltage is 0.5 volts to 5 volts. Because the test voltage is in the range, negative influences on the determination of the actual value or on the determination of the measurement signal can be reduced. In addition, because of these comparatively low electrical voltages, changes in resistance, which have a negative effect on the determination of the actual value or on the determination of the measurement signal, are reduced due to a strong heating of the heating element.

In some implementations, the voltage source is designed to output a maximum electrical voltage that is greater than or equal to 36 volts. According to further implementations, the voltage source is designed to output an electrical voltage that is 48 volts or more. In the case of vehicles that are for example driven by an electric machine in addition to an internal combustion engine, the electric machine being supplied with electrical energy from the voltage source, the catalytic converter area cools down comparatively quickly, since the internal combustion engine does not have to be operated continuously during the operating time of the vehicle because the electric machine can also drive the vehicle. Accordingly, it makes sense in the case of such vehicles to provide a heating device on the catalytic converter in order to heat up the catalytic converter area to the desired temperature range when the internal combustion engine is in operation. Voltage sources of such vehicles are designed to output an electrical voltage of greater than or equal to 36 volts. Accordingly, the voltage source that supplies the electric machine with electrical energy can also supply the electrical heating device with electrical energy. The number of voltage sources can be reduced as a result.

In some implementations, the selective energy supply of the electrical heating device from the voltage source is controlled by the comparison of the actual value with the setpoint value and/or by the comparison of the measurement signal with the setpoint voltage value. As a result, the activation of the electrical heating device can be adapted in accordance with the findings from the comparison or the comparisons. In some examples, the supply of the electrical heating device with electrical energy from the voltage source may also be controlled. The open-loop or closed-loop control described allows adapted and safe operation of the electrical heating device over its entire service life. As a result, checking and ensuring the functionality can be easily and reliably implemented.

In some implementations, a device for checking and ensuring the functionality of an exhaust gas aftertreatment system of an internal combustion engine has a control unit which is designed for controlling a method described above. The device may for example be an engine control unit. It is also conceivable that the device is part of the engine control unit or is installed as an additional control unit, for example in a vehicle with the internal combustion engine.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
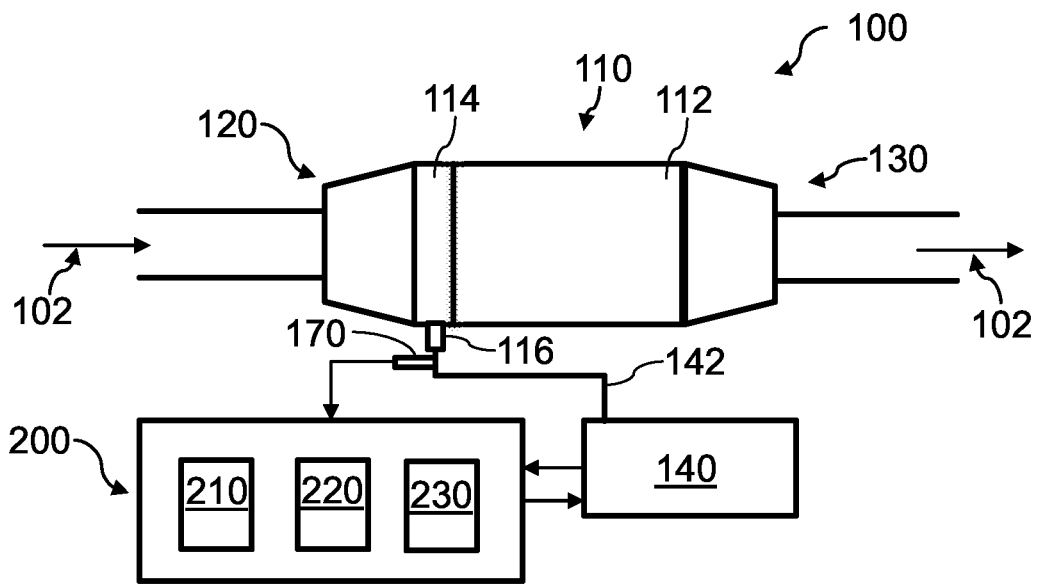
FIG. 1 shows a schematic representation of an exhaust gas aftertreatment system with a control unit.

FIG. 1 shows a schematic representation of an exhaust gas aftertreatment system 100 of an internal combustion engine. The exhaust gas aftertreatment system 100 has a catalytic converter 110, a voltage source 140 and a control unit 200. The catalytic converter 110 has a catalytic converter area 112 and an electrical heating device 114. The catalytic converter area 112 is set up to reduce pollutants from an exhaust gas 102. The heating device 114 is set up to heat the catalytic converter area 112. The heating device 114 is arranged upstream of the catalytic converter area 112 in the direction of exhaust gas flow. The catalytic converter 110 additionally has an exhaust gas inlet area 120 and an exhaust gas outlet area 130. The exhaust gas inlet area 120 is designed to allow exhaust gas 102 to flow into the catalytic converter 110. The exhaust gas outlet area 130 is designed to allow exhaust gas 102 to flow out of the catalytic converter 110.

The voltage source 140, for example a rechargeable battery or a battery, is designed to supply the heating device 114 with electrical energy. In this respect, the exhaust gas aftertreatment system 100 has a transmission cable 142 and the heating device 114 has a power connection 116. The electrical energy flows to the heating device 114 by way of the transmission cable 142 and the power connection 116.

As shown, the exhaust gas aftertreatment system 100 has a voltage measuring device 170. The voltage measuring device 170 is arranged at one end of the transmission cable 142 that is assigned to the heating device 114. The voltage measuring device 170 is accordingly arranged in the immediate vicinity of the heating device 114. The voltage measuring device 170 is designed to detect a value which is characteristic of an incoming voltage transmitted from the voltage source 140 to the heating device 114. Accordingly, the voltage measuring device 170 detects a value that takes transmission losses of the transmission cable 142 into account.

The control unit 200 has a computing unit 210, a program/data memory 220 and an error memory 230. In some examples, the recorded measurement data of the voltage measuring device 170 are transmitted to the control unit 200. In addition, measurement data of the voltage source 140 are transmitted to the control unit 200. The control unit 200 is designed to control the exhaust gas aftertreatment system 100 and also to check the exhaust gas aftertreatment system 100 for its functionality.

Figure 2:
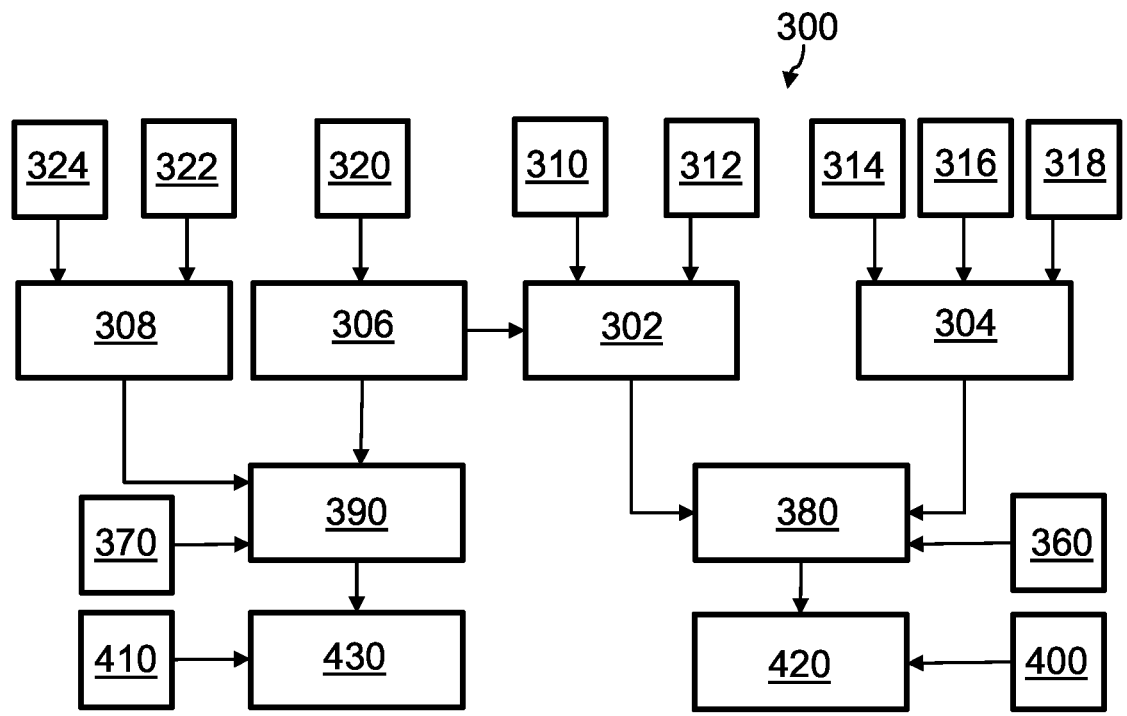
FIG. 2 shows a block diagram of a method for checking and ensuring the functionality of an exhaust gas aftertreatment system.

In some implementations, the control unit 200 is designed to carry out a method shown in FIG. 2 for checking and ensuring the functionality of the exhaust gas aftertreatment system 100. Accordingly, the control unit 200 is designed to determine an actual value 302 which is characteristic of an ohmic resistance of the heating device 114. At least one first actual value condition 310 and a second actual value condition 312 are taken into account for the actual value determination. The first actual value condition 310 is an electrical current strength supplied to the heating device 114. The second actual value condition 312 is an electrical voltage supplied to the heating device 114. In some examples, the control unit 200 is additionally designed to provide a setpoint value 304. It may be provided, for example, from the program/data memory 220. The setpoint value 304 here is characteristic of an expected ohmic resistance of the heating device 114. A first setpoint condition 314, a second setpoint condition 316, and a third setpoint condition 318 may be included in the process of providing the setpoint value 304. The first setpoint condition 314 takes into account a specific heating-up behavior of the heating device 114. The second setpoint condition 316 takes into account an expected long-term behavior of the catalytic converter 110. The third setpoint condition 318 takes into account ambient conditions such as an ambient temperature.

The control unit 200 is also designed to carry out a comparison of the actual value 302 with the setpoint value 304. In this respect, the computing unit 210 of the control unit 200 may be used. For the comparison of the actual value 302 with the setpoint value 304, in some examples, a first difference is formed from the actual value 302 and the setpoint value 304 by a first difference formation 380. The first difference is then compared with a first threshold value 360. The threshold value 360 may, for example, be stored in the program/data memory 220. The first difference may be formed continuously during the operation of the exhaust gas aftertreatment system 100. In some examples, the control unit 200 is designed to detect that the heating device 114 is not functioning as desired if the first difference deviates from the first threshold value 360 by at least a first specific amount 400. The first specific amount 400 may also be stored in the program/data memory 220 and provided from it. This first result formation 420 is also carried out with the computing unit 210. If it is detected that the heating device 114 is not functioning properly, an error entry may be made in the error memory 230. In addition, it is conceivable that an operator of the internal combustion engine or a driver of a vehicle in which the internal combustion engine with the exhaust gas aftertreatment system 100 is installed is shown an error by an error display device.

The control unit 200 is additionally designed to determine a measurement signal 306. When determining the measurement signal 306, a first measurement signal condition 320 is included. The first measurement signal condition 320 is in this case characteristic of a signal that is measured with the voltage measurement device 170 at the end of the transmission cable 142 facing the heating device 114. The control unit 200 may be additionally designed to provide a setpoint voltage value 308 by the program/data memory 220. The setpoint voltage value 308 may depend on a first voltage setpoint condition 322 and a second voltage setpoint condition 324. The first voltage setpoint condition 322 takes into account the expected electrical voltage that is intended to arrive at the heating device 114. The second voltage setpoint condition 324 takes into account at least one ambient parameter.

The control unit 200 is additionally designed to perform a second difference formation 390 with the measurement signal 306 and the setpoint voltage value 308 by the computing unit 210. According to this example with the computing unit 210, the control unit 200 is additionally designed to compare the result of the second difference formation 390 with a second threshold value 370. The second threshold value 370 may be stored in the program/data memory 220 of the control unit 200. With the second difference formation 340 and the comparison of the second difference formation 390 with the second threshold value 370, it can be determined whether the transmission of the electrical energy from the voltage source 140 to the heating device 114 is functioning properly. A second result formation 430 is carried out for this check. It is detected here that the transmission cable 142 is not functioning in accordance with its expected functionality if the second difference deviates from the second threshold value 370 by at least a second specific amount 410. The second specific amount 410 may be stored in the program/data memory 220 of the control unit 200.

As such, the method makes it possible, on the one hand, to check whether the exhaust gas aftertreatment system 100 is functioning properly and otherwise, if necessary, determine which components of the exhaust gas aftertreatment system 100 are not functioning properly. In addition, if problems are found, the control of the exhaust gas aftertreatment system 100 may be adapted in order to ensure that the functionality continues to be ensured. Overall, despite the possibility of checking, the exhaust gas aftertreatment system 100 has a simple construction, does not require any additional components and nevertheless allows the functionality of the exhaust gas aftertreatment system 100 to be checked. Overall, this makes the method and the device correspondingly reliable and robust.

A number of implementations have been described. Nevertheless, it will be understood that various modifications may be made without departing from the spirit and scope of the disclosure. Accordingly, other implementations are within the scope of the following claims.

What is claimed is:

1. A method for checking and ensuring functionality of an exhaust gas aftertreatment system of an internal combustion engine, the exhaust gas aftertreatment system includes a catalytic converter and a voltage source, the catalytic converter having a catalytic converter area and an electrical heating device which is selectively supplied with electrical energy from the voltage source, wherein the method comprising:
   determining an actual value which is characteristic of an ohmic resistance of the heating device, the actual value based on an electrical current strength supplied to the heating device and an electrical voltage supplied to the heating device from the voltage source;
   determining a setpoint value which is characteristic of an expected ohmic resistance of the heating device, the setpoint value based on a specific heating-up behavior of the heating device and an expected long-term behavior of the catalytic converter, the expected long-term behavior mapping a service life of the catalytic converter;
   comparing the actual value with the setpoint value by:
      determining a first difference from the actual value and the setpoint value; and
      comparing the first difference with a first threshold value; and
   determining a fault based on the comparison, when the first difference deviates from the first threshold value by at least a first specific amount, the fault is indicative of the heating device not functioning in accordance with the specific heating-up behavior and the expected long-term behavior.

2. The method of claim 1, wherein further comprising:
   determining, at a voltage measuring device arranged at an end of a transmission cable transmitting electrical energy from the voltage source to the heating device during operation of the heating device, a measurement signal indicative of the electrical voltage arriving at the heating device during operation,
   wherein the actual value is based on the measurement signal indicative of the electric voltage measured by the voltage measuring device.

3. The method of claim 2, further comprising:
   comparing the measurement signal of the voltage measuring device with a setpoint voltage value, the setpoint voltage value indicative of an expected electrical voltage arriving at the heating device during the operation of the heating device from the voltage source, wherein comparing the measurement signal with the setpoint voltage value includes:
      determining a second difference from the measurement signal and the setpoint voltage value, comparing the second difference with a second threshold value, and
determining that the transmission cable is not functioning in accordance with its expected functionality when the second difference deviates from the second threshold value by at least a second specific amount.

4. The method of claim 3, wherein the setpoint value and/or the setpoint voltage value take(s) into account current ambient conditions.

5. The method of claim 3, wherein the setpoint value and/or the setpoint voltage value is/are provided as a characteristics map.

6. The method of claim 2, wherein the determination of the actual value and/or the determination of the measurement signal is/are determined by using an electrical test current strength supplied to the heating device and an electrical test voltage supplied to the heating device from the voltage source.

7. The method of claim 6, wherein the electrical test voltage is 0.5 volts to 5 volts.

8. The method of claim 1, wherein the voltage source is designed to output a maximum electrical voltage that is greater than or equal to 36 volts.

9. The method of claim 3, wherein the selective energy supply of the electrical heating device from the voltage source is controlled by the comparison of the actual value with the setpoint value and/or by the comparison of the measurement signal with the setpoint voltage value.

10. A device for checking and ensuring functionality of an exhaust gas aftertreatment system of an internal combustion engine, the exhaust gas aftertreatment system includes a catalytic converter and a voltage source, the catalytic converter having a catalytic converter area and an electrical heating device which is selectively supplied with electrical energy from the voltage source, the device includes a control unit configured to:
determine an actual value which is characteristic of an ohmic resistance of the heating device, the actual value based on an electrical current strength supplied to the heating device and an electrical voltage supplied to the heating device from the voltage source;
determine a setpoint value which is characteristic of an expected ohmic resistance of the heating device, the setpoint value based on a specific heating-up behavior of the heating device and an expected long-term behavior of the catalytic converter, the expected long-term behavior mapping a service life of the catalytic converter; and
compare the actual value with the setpoint value by:
determining a first difference from the actual value and the setpoint value; and
comparing the first difference with a first threshold value; and
determine a fault based on the comparison, when the first difference deviates from the first threshold value by at least a first specific amount, the fault is indicative of the heating device not functioning in accordance with the specific heating-up behavior and the expected long-term behavior.

11. The device of claim 10, wherein the exhaust gas aftertreatment system includes a voltage measuring device arranged at an end of a transmission cable transmitting electrical energy from the voltage source to the heating device during operation of the heating device, the voltage measuring device determines a measurement signal indicative of the electrical voltage arriving at the heating device during operation, wherein the actual value is based on the measurement signal indicative of the electric voltage measured by the voltage measuring device.

12. The device of claim 11, wherein the control unit is further configured to:
compare the measurement signal of the voltage measuring device with a setpoint voltage value, the setpoint voltage value indicative of an expected electrical voltage arriving at the heating device during the operation of the heating device from the voltage source, wherein comparing the measurement signal with the setpoint voltage value includes:
determining a second difference from the measurement signal and the setpoint voltage value,
comparing the second difference with a second threshold value, and
determining that the transmission cable is not functioning in accordance with its expected functionality when the second difference deviates from the second threshold value by at least a second specific amount.

13. The device of claim 12, wherein the setpoint value and/or the setpoint voltage value take(s) into account current ambient conditions.

14. The device of claim 12, wherein the setpoint value and/or the setpoint voltage value is/are provided as a characteristics map.

15. The device of claim 10, wherein the determination of the actual value and/or the determination of the measurement signal is/are determined by using an electrical test current strength supplied to the heating device and an electrical test voltage supplied to the heating device from the voltage source.

16. The device of claim 15, wherein the electrical test voltage is 0.5 volts to 5 volts.

17. The device of claim 10, wherein the voltage source is designed to output a maximum electrical voltage that is greater than or equal to 36 volts.

18. The device of claim 12, wherein the selective energy supply of the electrical heating device from the voltage source is controlled by the comparison of the actual value with the setpoint value and/or by the comparison of the measurement signal with the setpoint voltage value.

* * * * *